United States Patent Office 3,803,100
Patented Apr. 9, 1974

3,803,100
METHOD FOR PREPARING SOLUBLE POLYAMIDEIMIDES
Masahiro Izumi, Osaka, Shigeru Matsumura, Hyogo, Nobuyuki Asano, Osaka, and Munetaka Kawaguchi, Hyogo, Japan, assignors to Sumitomo Electric Industries, Ltd., Osaka, Japan
No Drawing. Continuation-in-part of abandoned application Ser. No. 693,747, Dec. 27, 1967. This application July 12, 1971, Ser. No. 161,968
Claims priority, application Japan, Dec. 29, 1966,
42/1,010; 42/1,011
Int. Cl. C08g 20/32, 51/32, 51/44
U.S. Cl. 260—78 TF
6 Claims

ABSTRACT OF THE DISCLOSURE

Phenolic acidic solvent-soluble and infusible linear aromatic polyamide-imides of high molecular weight having amide bonding and a 5-membered imide ring in the molecule which is obtained by subjecting tricarboxylic anhydride and diisocyanate to heating and melt state reaction at a temperature not exceeding 205° C., and then subjecting them to solid state polymerization reaction at a temperature not exceeding 205° C., the molar ratio between said diisocyanate and said tricarboxylic anhydride being 1:1.

CROSS REFERENCE TO RELATED APPLICATIONS

This application is a continuation-in-part application of Ser. No. 693,747, filed on Dec. 27, 1967, now abandoned and claims priority based upon Japanese applications filed Dec. 29, 1966.

BACKGROUND OF THE INVENTION

Field of the invention

This invention relates to phenolic acidic solvent-soluble and infusible linear aromatic polyamide-imides of high molecular weight obtained by heating tricarboxylic anhydrides and diisocyanates for melt phase reaction and then causing them to undergo solid state reaction, and to their polymer solutions, and to a method of manufacutring them.

More particularly, this invention relates to phenolic acidic solvent-soluble and infusible linear aromatic polyamide imides of high molecular weight having amide bond and five-membered imide ring in the molecule obtained by heating tricarboxylic anhydrides and diisocyanates for melt phase reaction, converting them into an infusible porous solid as the reaction goes on, and causing the low molecular weight polymer, still containing a great deal of isocyanate groups, acid anhydride groups and carboxyl groups remaining in it, to undergo solid state reaction in continuation under fully controlled temperature conditions (205° C. or less). The invention also relates to stable polymer solutions obtainable by dissolving the product in a solvent, and to a method of manufacturing the resins.

Description of the prior art

It has long been known that generally an isocyanate group reacts with a carboxyl group and forms an amide bond, generating carbon dioxide. It has also been known that an isocyanate group reacts with an acid anhydride group and forms a five-membered imide ring, generating carbon dioxide. It is also publicly known that cellular plastic products of insoluble and infusible foamed products obtained by using carbon dioxide generated when tricarboxylic anhydrides, containing a carboxyl group and an acid anhydride group, are caused to react with polyisocyanates. It is also publicly known that diisocyanates and tetracarboxylic dianhydride are heated to react with each other in such a basic solvent as N.N-dimethylacetamide, N.N-dimethylformamide, N-methyl-2-pyrrolidone, etc., a reaction takes place generating carbon dioxide. However, the product becomes insoluble in the basic solvent while it still has a low molecular weight, precipitates and gets out of the reaction system, so that it becomes a heterogeneous system. Thus, no high molecular weight products are obtained.

In recent times a great deal of investigation is being made for high polymers which have excellent thermal, mechanical, electrical, chemical and other properties. Especially, polyimides are put to practical use in industry. These have various excellent properties, such as thermal stability, owing to the five-membered imide ring. It is generally known that thermal stability is remarkably improved by the introduction of a heterocyclic ring into the molecule. However, as can be seen from the aforementioned described reaction of diisocyanates and tetracarboxylic dianhydrides, the product, having formed a heterocyclic ring, is insoluble in the solvent. For this reason, a polymer solution of polyimide is obtained in the state of polyamic acid by subjecting diamine and tetracarboxylic dianhydride to a low temperature solution polymerization process in a basic solvent like N.N-dimethylacetamide, N.N-dimethylformamide, N-methyl-2-pyrrolidone, etc.

Because of the above fact, a great deal of caution is required in storing the solution. In addition, it is known that the product in the state of polyamic acid is subject to hydrolysis, and is extremely unstable because of the remarkable moisture-absorbing property of basic solvents. In addition, polyimides have poor abrasion resistance, so that cautious handling will be necessary when it is used in making electric wires of the like. Also, because of the inherent property of the five-membered imide ring, it has poor alkali resistance. If immersed in a 5% caustic soda solution for 24 hours, a polyimide film is almost all dissolved.

On the other hand, whole aromatic polyamides are synthesized from di-acid chloride and diamine. This whole aromatic polyamide is extremely superior in abrasion resistance and alkali resistance because of its amide bond. Though it is not as good as a polyimide, its thermal stability is very good when compared with that of other generally known polymers. Needless to say, it is insoluble in cresols and it has a disadvantage in that it has very little solubility, or is even insoluble in such basic solvents as N.N - dimethylformamide, N.N - dimethylacetamide, N.N-methyl-2-pyrrolidone, etc.

Phenolic acidic solvent-soluble and infusible linear aromatic polyamide-imides of high molecular weight synthesized according to the present invention possess excellent thermal stability, having five-membered imide ring which is the greatest characteristic feature of the polyimide. On the other hand, it possesses excellent abrasion resistance and alkali resistance which are the merits of whole aromatic polyamides. Furthermore, it has an excellent solubility notwithstanding the fact that five-membered imide ring has already been formed and it has aromatic amide bonding. In addition, a polymer solution of a high concentration may be obtained, even if a phenolic acidic solvent like cresol is employed.

In this connection, there is no fear of hydrolysis because the five-membered imide ring has already been formed. When a phenolic acidic solvent is used, it scarcely absorbs moisture, so that a stable polymer solution may be obtained even if it may be left in whatever condition.

The present invention makes it also possible to use as starting materials tricarboxylic anhydrides, dicarboxylic acids, tetracarboxyl dianhydrides and diisocyanates which are easily obtainable on the market, and to use as a solvent, material having a phenolic hydroxy group, like cresol which is very cheap and exhibits an excellent working stability. The solvent is used here because the polymeric products are infusible, so that a polymer solution is prepared due to the necessity of working. In the final stage of the application, therefore, the solvent is heated and removed. Generally, the solid contents in a polymer solution are 40% or less at best, the balance of 60% being the solvent. It is, therefore, obvious that it is extremely advantageous for industrial purposes if a solvent which is cheap and of excellent workability and stability can be used.

Phenolic acidic solvent-soluble and infusible linear aromatic polyamide-imides of high molecular weight synthesized by the method of the present invention may be dissolved in a phenolic acidic solvent like cresol which reacts with the isocyanate group, carboxyl group and acid anhydride group, since its polymeric products may be obtained in a solid state. If a phenolic acidic solvent like cresol is used, such solvent is very cheap, has a good workability and is not moisture-absorbent, so that the polymer solution is stable in whatever conditions it may be left.

If the reaction of the tricarboxylic anhydride with diisocyanate is conducted in a phenolic acidic solvent such as cresol, which is reactive with the isocyanate group, carboxyl group and acid anhydride group, the reaction between the phenolic acidic solvent and the isocyanate group having been completed prior to the reaction between the tricarboxylic anhydride and the isocyanate group, inhibits the objective phenolic acidic solvent linear aromatic polyamide-imide of high molecular weight, from being produced by the reaction between the tricarboxylic anhydride and diisocyanate. Moreover, the reactant takes the solvent-soluble form, as set forth in Comparison Example 5. Thus, the objective material of the present invention cannot be obtained.

To obtain a polymer solution by using a reactive solvent like cresol is only possible when the solid state polymerization method of this invention is employed.

A part of the aforementioned tricarboxylic anhydrides may be substituted with dicarboxylic acids or tetracarboxylic dianhydrides within the range permitted by solubility, depending on the properties required. In this case, is is preferable for the reasons of foam forming, solubility, etc., that the dicarboxylic acids are 60 mol percent or less of tricarboxylic acid anhydrides and tetracarboxylic dianhydrides are 25 mol percent or less.

In the present invention, diisocyanates are used to obtain a soluble resin.

The present inventors have discovered that the high molecular weight polymeric products obtained by the method of this invention have a film-forming ability and are extremely useful as electrical insulating materials. The film, insulated electric wire, varnish cloths, laminates, laminated tubes, etc., made from the solution of said polymer are highly excellent with respect to electrical properties, thermal properties, mechanical properties and chemical properties.

The object of the invention of this application is, as already stated, to obtain phenolic acidic solvent-soluble and infusible linear aromatic polyamide-imides of high molecular weight which have an amide bond and a five-membered imide ring in the molecule.

SUMMARY OF THE INVENTION

It is, therefore, of importance in this invention that tricarboxylic anhydrides and diisocyanates are subjected to melt phase reaction and infusible resinous products are then formed, and in order to obtain products of higher molecular weight from said infusible resinous products, it is necessary to effect polymerization in the solid state under fully controlled temperature conditions. That is to say, in order to prevent the formation of an insoluble phenolic acidic solvent product, it is necessary that the temperature is 205° C. or lower when said infusible resinous products are subjected to reaction in a solid state.

The reason why the temperature at which the solid state polymerization reaction is caused to take place is prescribed to be 205° C., or lower is because it is necessary to have the reaction take place selectively at a temperature which is completely controlled so that carboxylic group and anhydride group may not react together to make the product which is insoluble in a phenolic acidic solvent. If the solid state polymerization is effected at a temperature exceeding 205° C., various side reactions take place because of the great activity of isocyanate group. Thus, the polymeric products become crosslinked or are transformed into insoluble phenolic acidic solvents and organic acidic solvents. Eventually insoluble phenolic acidic solvent and organic acidic solvent products are formed which are not suitable for the purpose of the present invention. This is shown in Comparison Example 4.

The fact that the polymeric products obtained after the solid state reaction are those of a higher degree of polymerization (the reaction having proceeded further than that of the products of the melt phase reaction), has been proved by means of infrared spectrum and the measurement of reduced specific viscosity.

However, in the case where the solid reaction taking place at a temperature of above 205° C., the hydrogen atom in the formed amide bond

becomes an active hydrogen and reacts with the isocyanate group. The carboxyl group reacts with the isocyanate group to be decarbonated and to the group

or other groups (other than the amide group). In addition, pentacyclic imide bonding is introduced into the molecular structure by a side reaction, such as polymerization of the isocyanate groups with each other. Moreover, the reaction products of these reactions are three-dimensionalized and insolubilized and the object of the present invention, i.e. to obtain a straight chain, high molecular weight, soluble polyamide having excellent heat resistance, is prevented. Such three-dimensionalization must be avoided in order to obtain a polymer solution and it is an indispensable requirement in the obtaining of a polymer solution to first obtain a straight chain, high molecular weight molecule.

One of the salient features of the product applicable to the present invention and its process for preparation resides in the fact that the reactants employed (that is, the diisoycanate and the tricarboxylic anhydride) are present in a molar ratio of 1:1 respectively. It is this specific molar reactant ratio which permits the products of the present invention to attain the necessary degree of polymerization, which imparts to these compounds the various attributes heretobefore alluded to. It is because of these attributes, that these compounds produced in the present invention find suitable use in the field of films and heat-insulating materials.

In addition to the foregoing requirement, two other essential features must be present; that is, there must first occur, a melt state reaction followed by a solid state reaction, wherein the temperature range of the melt state reaction ranges from 40° C. to not exceeding 205° C., and the temperature range of the solid state reaction is the same as that for the melt state reaction.

Based on the foregoing, it is readily apparent that in the absence of any one of the aforementioned three features, the goals of the present invention cannot be attained. For example, in the case where the molar ratio between the tricarboxylic anhydride and diisocyanate fails to reach 1:1, there can only be obtained an insoluble lower molecular weight or terpolymerized product as described in Comparison Example 1. In the case where the temperature range fails to meet the requirements necessary (between 40° C. and 205° C.) again, a terpolymerized product is obtained, which is solvent-insoluble and infusible as shown by Comparison Example 4. Finally, in the case where both a solid state reaction and melt state reaction have not occurred, a product is formed which lacks sufficient high molecular weight and which further lacks the ability to act as a heat-insulating film. See for instance, Comparison Example 5.

When tricarboxylic anhydrides and diisocyanates are caused to react with each other, the speed of the melt reaction and solid state reaction can be increased and products of a higher degree of polymerization can be obtained, providing an organic polar reagent is used as a catalyst.

The use of such an organic polar reagent as N.N-dimethylamide in a catalytic quantity activates the isocyanate group. As a matter of fact, in the reaction of a carboxyl group or acid anhydride group, and an isocyanate group as that of the present invention, it is obvious as shown in the embodiments that organic polar reagents have a catalytic effect.

As already stated, it is necessary to have the solid state reaction take place under controlled temperature conditions in order to obtain a phenolic acidic solvent-soluble infusible linear aromatic polyamideimide of high molecular weight. Thus, the reaction speed is slow. When said organic polar reagent is used in the reaction of the invention of this application, it has a remarkable catalytic effect in the molten condition at the initial stage of the reaction and in addition it is distributed completely uniformly in the reaction product which foams and solidifies, so that it retains its catalytic effect in the subsequent solid state reaction as well.

These polar reagents evaporate together with the solvent when the polymer solution is heated to remove the solvent and leave no residue at all. Besides, even if a small quantity of such reagents is present in a polymer solution, it has no detrimental effect on the stability of amide bond and five-member imide ring. As mentioned later, the reaction may be accelerated by the use of a catalyst.

If tricarboxylic anhydrides and diisocyanates are caused to react with each other, carbon dioxide is generated as a result of the reaction. When the reaction products become infusible, carbon dioxide is enclosed therein and produces foams. As is well known, a foamed solid is highly useful as a heat insulating material. It is very difficult to heat the whole of a solid uniformly under the condition that the temperature is 205° C., or lower for solid state reaction, which consequently takes a long time. In the invention of the present application therefore, a solvent which does not react with the isocyanate group, acid anhydride group and carboxyl group and does not dissolve and swell the resinous products and whose boiling point does not exceed 205° C., is added when the solid state reaction is effected in order to heat them from the interior, thereby making it possible to effect uniform heating and to effect the reaction under fully controlled temperature conditions. This is remarkably effective, in not only increasing the reaction speed, but also enhancing the final value of reduced specific viscosity.

If tricarboxylic anhydrides containing carboxyl groups and anhydride groups and isocyanates are caused to react with each other, 44.8 liters carbon dioxide at 0° C., 1 atmospheric pressure, is generated for every mol of tricarboxylic anhydride.

Because of this carbon dioxide, the reaction products foam as they become viscous towards the end of the molten condition, and become very bulky. It is very difficult to control their volume to a fixed volume. In addition, the reaction of isocyanate group and carboxyl group and acid anhydride group calls for a high temperature, so that it is necessary to isolate the reaction system from the outer atmosphere in order to avoid side reactions that may be caused by active hydrogen compounds more active than carboxyl groups and acid anhydride groups, such as water in the air. Consequently, where the object is not to obtain a foamed product but to obtain the powder of a resin obtained or a polymer solution, the fact that the product acquires a very bad foamed volume and it is impossible to control that volume, proves to be a very disadvantageous condition in utilizing the method for industrial purposes. This is due to the fact that the weight of the materials which can be subjected to the reaction in a vessel of a fixed capacity is very little and the operation becomes unstable. It will have a very great industrial value if a method which enables the volume of the reaction products to decrease and which makes it possible to control it to a volume as required is obtained. Also the reaction products in the end condition of the melt phase reaction still contain a great deal of unreacted isocyanate groups, carboxyl groups and acid anhydride groups, and are polymers of very low molecular weight. In order to obtain phenolic acidic solvent-soluble and infusible linear aromatic polyamide-imides of high molecular weight which has a practical value, it is necessary to effect the solid state polymerization reaction under fully controlled temperature conditions in continuation after foaming and solidifying to avoid reaction to make them insoluble.

If therefore, an organic liquid which is chemically unreactive and does not dissolve the reaction products is added from the initial stage of the reaction, the foamed volume is remarkably decreased depending on the quantity added and it becomes possible to control the volume. As is well known, a foamed material is usable as a heat-insulating material. Also in the reaction of the present invention, since the thermal conduction to the interior decreases suddenly upon foaming, so that the temperature distribution becomes non-uniform, it becomes impossible to have the reaction proceed uniformly and the interior remains unreacted. However, if an organic material which is chemically unreactive and which does not dissolve the reaction products is added from the initial stage of the reaction, the interior of the reaction system can always maintain a fixed temperature distribution by virtue of the vapor of that solvent. As this enables the reaction to take place uniformly and speedily, the reaction time can be shortened. Even if the reaction product becomes foamed, it is prevented from solidifying by the heat of the vapor of the organic liquid, so that carbon dioxide generated as a result of the reaction can be discharged into the atmosphere. Accordingly, it is possible to suppress increase in the volume and to control it. Thus, it is possible to obtain industrially, a soluble resin from tricarboxylic anhydrides and polyisocyanates.

What is called "solid state reaction" in the present invention is the reaction after tricarboxylic anhydrides and polyisocyanates have undergone melt reaction, foamed and solidified.

DETAILED DESCRIPTION OF THE INVENTION

The solid state and melt state reactions

The melt state reaction comprises an initial fusing of the tricarboxylic anhydride and diisocyanate at a temperature of below 205° C., which temperature varies depending upon the monomer form employed. The melt state reaction is essential to success of the instant invention, but care must be taken not to exceed 205° C., since gelation and subsequent terpolymerization occurs. Accordingly, this phase must be carried out at a temperature below 205° C.

The melt state reaction brings gradual increase to the molecular weight of the polymer in its linear state. The melt state reaction proceeds at temperatures which eventually exceed that of the initial tricarboxylic acid anhydride and diisocyanate reaction temperature. Thus, at the point where the melt state reaction temperature exceeds that of the initial tricarboxylic acid anhydride and diisocyanate reaction temperature, a solid phase is reached. The particular temperature at which the solid state is reached, cannot be explicitly set forth, since it is obvious that it will vary depending on the particular monomer employed in the initial reaction. What is important, is that the melt state reaction temperature eventually exceeds that of the initial reaction temperature between the reactants employed, and yet, not exceed the critical limit of 205° C., or fall below the lower limit of 40° C. Similarly, no extreme importance is attached to the particular amount of time necessary to achieve the solid phase or solid state point, the main essential feature being the employment of an initial melt state followed by a solid state reaction. The reaction temperature and time during the melt state, as indicated, will be determined by the particular monomer employed and does not in itself, constitute an essential part of the instant invention.

To further define the solid state reaction, this term pertains to the reaction wherein the polymer in its solid phase (see above remarks) is further heated to cause an additional increase in the molecular weight, provided however, that the increase in temperature fails to exceed 205° C. As to the amount of heat increase necessary to achieve the desired high molecular weight polymer in the solid state, it is sufficient for the purposes of this invention to say that this will vary depending on the particular use to which the final product is to be applied.

To reiterate, it is essential to the goals of the present invention that (1) a tricarboxylic acid anhydride/diisocyanate ratio of 1:1 be maintained, (2) that an initial melt state reaction be employed, and (3) followed by a solid state reaction, the temperature range applicable to the latter two reactions ranging from 40° C. to 205° C. The failure to operate within the aforementioned parameters, will lead to a final product of inferior quality and non-applicability to the uses maintained herein.

The examples of the tricarboxylic anhydrides which may be used in the present application are trimellitic anhydride (anhydride of trimellitic acid), hemimellitic anhydride, etc., which are compounds containing a carboxylic group and an anhydride group. Dicarboxylic acids, which may substitute a part of tricarboxylic anhydrides mentioned above within the range permitted by solubility are terephthalic acid, 4,4'-dicarboxybiphenol, 4,4'-dicarboxyldiphenyl ether, etc., and may contain in the positions where the alkoxylic group is not substituted a group such as an alkyl group, alkoxy group, halogen group, haloalkyl group, nitro group, etc., which does not react with the isocyanate group, carboxyl group and acid anhydride group. A dicarboxylic acid containing a five-membered imide ring may also be used. Illustrative of tetracarboxylic dianhydrides which may substitute a part of the tricarboxylic anhydrides within the range permitted by solubility are, for example, pyromellitic dianhydride, naphthalene tetracarboxylic dianhydrides, or dianhydrides which have two or more aromatic nuclei in a molecule, e.g., 3.3', 4.4'-benzophenone tetracarboxylic dianhydride, biphenyl-3.3', 4.4'-tetracarboxylic dianhydride, etc.

The diisocyanates among the polyisocyanates which may be used in the present application are compounds in which two isocyanate groups are present as reactive substitutes in the nuclei of benzene, naphthalene, diphenylalkane, diphenylketone, diphenylether, biphenyl, etc. They are, for example, 13-benzenediisocyanate, diphenylmethane-4.4'-diisocyanate, diphenylether-4.4'-diisocyanate, 1.5-naphthalenediisocyanate, biphenyl-4.4'-diisocyanate, etc. They may also be diisocyanates which have in said nuclei a substitute which does not react with the isocyanate group, carboxylic group and anhydride group, e.g., 2.4-tolylene diisocyanate, 3.6 tolylene diisocyanate, etc., or aliphatic isocyanates containing an aromatic nucleus, e.g., m-xylylene diisocyanate, p-xylylene diisocyanate, etc.

As a suitable solvent, acidic solvents, such as cresols, xylenols, etc., are most preferable. Solutions may also be made in such basic solvents as N.N-dimethylacetamide, N.N-dimethylformamide, N.N-diethylformamide, N-methyl-2-pyrrolidone, etc.

It is also possible to use a diluent, a ketonic solvent as acetone, ester solvent as ethyl acetate, or an aromatic hydrocarbon such as benzene, toluene, xylene, etc. Especially in the case of the solution of polymer in cresol, the viscosity of the solution may be greatly reduced by the use of such a diluent.

What is mentioned as solvents which do not react with the isocyanate group, carboxylic group and acid anhydride group and which do not dissolve the reaction product is a solvent, such as O-dichlorobenzene, which has a halogen bonded to the benzene nucleus, ketonic solvent like acetone, ester solvent like ethyl acetate, or aromatic hydrocarbons, such as benzene, xylene, toluene, etc., or their mixtures, which are solvent naphtha having various boiling points. As a solvent naphtha, those having a boiling point of 150°–200° C., or so are preferable.

In the reaction of the present application, a substance which acts as a reaction catalyst for the isocyanate group and active hydrogen may be used. Such a substance markedly accelerates the reaction between tricarboxylic anhydride and isocyanates. For example, the organic compounds of tin (stannous oleate, dibutyltindilaurate, stannous octoate, tributyltin chloride, etc.), tertiary amines (triethylamine, N-ethylmorpholine or other N-substituted morpholines), alkali metal salts (lithium ricinoleate, sodium oleate, etc.), heavy metal salts of cobalt (cobalt naphthenate, cobalt acetate, etc.) and other metal salts and organic metal compounds are suitable for this purpose. Other organic polar reagents which may be used as excellent catalysts are, for example, N,N-dimethylacetamide, N-methyl-2-pyrrolidone, N,N-diethylformamide, N,N'-dimethylformamide, hexamethyl-phosphoramide, 2,5-dihydrofuran, dimethylsulfone, nitrobenzene, diethyl-cyanamide, acrylonitrile, dimethylthiophene, etc.

In the text of the British patent specification 1,09,956 reference is made to the "manufacture of soluble and fusible resins" and an example of embodiment is given. A study of this reference is therefore made in References 1, 2 and 3 of this application. According to the results of the study, as shown in References 1 and 2, an unreacted carboxylic group, anhydride group and isocyanate group are still found remaining. Their polymerization degree is lower than the average polymerization degree 6 (in case carboxylic group and anhydride group have completely reacted) and, as is seen from the fact that it becomes jelly-like if dissolved in N.N-dimethylacetamide, it is not desirable also from the viewpoint of stability to prepare the polymer solution with isocyanate group left in a free state.

As shown in Reference 3, it is seen that the product has no film-forming ability and is not good for practical purposes even when equimolar reaction has been effected.

In consequence, if a soluble polymeric product of high molecular weight is to be obtained, it is necessary to carry out solid state polymerization reaction under fully controlled temperature conditions as described in the present application.

For comparison's sake, references will be given and then embodiments of the present invention will be mentioned. These are, however, for the purpose of aiding in the understanding of the present invention. The present invention is by no means to be restricted by them.

In the references and embodiments mentioned later, the reduced specific viscosity is that measured in N.N-dimethylacetamide at 30° C., at the concentration of 0.5 gr. polymer in 100 cc. solvent. In preparing the specimens for this measurement, the reaction products were pulverized in a nitrogen-purged dry box and were put in a flask together with a large quantity of dehydrated and purified methanol and several drops of N.N-dimethylacetamide; unreacted isocyanate group and anhydride group reacted, with methanol refluxed in nitrogen gas flow; the disappearance of absorption by the isocyanate group and anhydride group were confirmed by infrared spectrum, and then the specimen was dissolved in a solvent and thrown into a large quantity of methanol, whereby the polymer was separated; it was then rinsed and subjected to vacuum drying for 2 days at room temperature to obtain a powdery resin. The film was obtained by applying the polymer solution to an aluminum plate, aluminum foil or copper plate and baking it for 1 hour at 100° C., and another hour at 250° C.

The laminated boards were made by impregnating glass fiber material (glass cloth, glass mat, glass robing) or asbestos paper with the polymer solution, putting such sheets together to the requisite thickness after continuous heating for drying at 80–200° C., and then pressing them together under the conditions of pressure 1–800 kg./cm.$^2$ temperature 80–400° C., and time 10–120 minutes.

The N-methyl-2-pyrrolidone and N.N-dimethyl acetamide used were those that had been dehydrated by reflux with an addition of phosphorous pentaoxide after dehydration as an azeotrope with benzene and distilled for purification. The cresol used was that which had been dehydrated as a benzene azeotrope and then distilled for purification. The methanol used was that which had been dried with an addition of calcium oxide and then distilled.

The aromatic hydrocarbon used as the heat medium (solvent naphtha) was that which had been dehydrated by reflux with an addition of phosphorous pentoxide after dehydration as a benzene azeotrope and then distilled for purification.

As an apparatus for the reaction, a four-necked flask provided with two reflux condenser tubes having a calcium chloride tube in their upper part and with a thermometer and a stirrer was used. The weighing of all the specimens was done in a nitrogen-substituted dry box. The reaction was effected in an oil bath, and all the temperatures shown in the references and embodiments are those in the oil bath.

Where a part of tricarboxylic anhydride is substituted with dicarboxylic acid, it is necessary, as shown in the embodiments, that first the tricarboxylic anhydride and diisocyanate are heated for reaction into a homogenous solution and after continuing the reaction in that state for some time, the reaction is continued with the addition of a dicarboxylic acid, or that first the dicarboxylic acid and diisocyanate are heated for reaction into a homogenous solution and then tricarboxylic anhydride is added. In the latter case, it takes a considerably longer time than in the former case to obtain a homogenous solution because the solubility of dicarboxylic acid in diisocyanate is poor. The reason why it is necessary to follow the aforementioned procedure is that if tricarboxylic anhydride and dicarboxylic acid and diisocyanate are caused to react simultaneously, dicarboxylic acid fails to dissolve and foaming takes place in a heterogeneous state leaving a considerable amount of dicarboxylic undissolved. This is the same where tetracarboxylic acid dianhydride is used.

The following examples are for the purpose of comparison with the results of the present invention.

Comparison Example 1

Two reflux condensers provided with calcium chloride tubes in the upper parts, a thermometer and a stirrer were installed in a four-necked flask of 2 liter capacity. 54.89 trimellitic anhydride and 100.0 g. diphenylmethane-4.4'-diisocyanate were weighed out in a nitrogen-substituted dry box to make trimellitic anhydride: diphenylmethane-4.4'-diisocyanate=1:1.4 (molar ratio). The temperature was slowly raised in an oil bath under nitrogen flow, reaction made for 1 hour at 125° C., and then temperature slowly raised to 200° C., in 3 hours, when, despite strong stirring, the contents foamed and expanded to fill the flask. In the meantime, the generation of carbon dioxide was confirmed by the whitening of an aqueous solution of barium hydroxide. The product obtained is soluble in N.N-dimethylacetamide and N-methyl-2-pyrrolidone, but in both cases produces a jelly-like film immediately after dissolution and foaming is observed; the whole becoming a jelly-like substance after a while. Specimens of different concentrations were prepared, but still they became a jelly-like substance likewise. It is, on the other hand, insoluble in cyclohexanone, ethyl acetate and acetone. Although heated in nitrogen flow for 3 hours at the reflux temperature of each of these solvents, it was not dissolved. The reduced specific viscosity of the resin obtained by methanol-treatment of this product was 0.095.

From the infrared spectrum of the reaction product it is noted that there remains a series of small absorption bands of 3000–2500 cm.$^{-1}$ due to carboxyl group, absorption of 1845 cm.$^{-1}$ due to acid anhydride group and strongly the absorption of 2260 cm.$^{-1}$ due to isocyanate group. In the infrared spectrum of the reaction product that has been given methanol treatment, the absorptions of 2260 cm.$^{-1}$ and 1845 cm.$^{-1}$ have disappeared. From this fact it has been confirmed that they have completely reacted with methanol and been blocked.

Comparison Example 2

In the same way as in Comparison Example 1, 100 g. diphenylmethane-4.4-diisocyanate was molten at 100° C., and 54.8 g. trimellitic anhydride was added and stirring continued.

Temperature was raised to 120° C., and reaction continued for 1 hour, then temperature raised to 160° C., in another hour, reaction finished and cooled. The product thus obtained is insoluble in ethyl acetate and acetone, and dissolves in cyclohexanone leaving a part of it undissolved. It is soluble in N.N-dimethylacetamide and N-methyl-2-pyrrolidone, but becomes a jelly-like substance just as in the case of Comparison Example 1. The reduced specific viscosity of the methanol-treated product is 0.051. The findings about its infrared spectrum are the same as those of Reference 1.

Comparison Example 3

With the same reaction apparatus as in Comparison Example 1, in use, 48.03 g. (0.25 mol) trimellitic anhydride and 62.56 g. (0.25 mol) diphenylmethane-4.4-diisocyanate were weighed out, caused to react for 1 hour at 125° C., in oil bath, then temperature raised to 180° C., in 1 hour 30 minutes, further raised to 200° C., in 1 hour, when foaming began to take place in spite of stirring. The reaction was, therefore, brought to an end at this point.

As in the case of References 1 and 2, the infrared spectrum of the reaction product shows that a series of small absorption bands of 3000–2500 cm.$^{-1}$ due to carboxyl group, absorption of 2260 cm.$^{-1}$ due to isocyanate group and absorption of 1845 cm.$^{-1}$ due to acid anhydride group still intensely remain. The reduced specific viscosity of the methanol-treated resin was 0.088.

The product obtained is soluble in N.N-dimethylacetamide and partly soluble in cyclohexanone. It is insoluble in ethyl acetate and acetone even at their reflux temperatures. Its solution in N.N-dimethylacetamide was baked on aluminum foil and copper plate. It had no film-forming ability but foamed, and cracked upon slight bending.

Comparison Example 4

In the same way as in the case of Comparison Example 1, 96.06 g. (0.5 mol) of trimellitic anhydride and 125.13 g. (0.5 mol) of diphenylmethane-4.4'-diisocyanate and 10 g. of N.N-dimethylacetamide are caused to react, so that trimellitic anhydride:diphenylmethane-4,4'-diisocyanate=I:I (molar ratio). They were caused to react for 1 hour at 120° C., and temperature raised to 160° C., in 40 minutes, when the product violently foams and solidifies. It is pulverized in nitrogen flow and this porous foamed product is further subjected to reaction at 210° C., for 3 hours with slow stirring. Then the reaction is brought to an end. If the infrared spectrum of this product is inspected, it is found that the absorption of 2260 cm.$^{-1}$ due to isocyanate group still remains. If 20 g. of the reaction product is heated and stirred with an addition of 80 g. of m-cresol, it is still intransparent. If it is dissolved in N.N-dimethylacetamide, it does not dissolve completely but is in a condition showing a little insoluble turbidity unique to gelation.

Comparison Example 5

96.06 g. (0.5 mol) of trimellitic anhydride and 125.13 g. (0.5 mol) of diphenylmethane - 4.4' - diisocyanate are caused to react in 400 g. of m-cresol for 4 hours at 120° C. and for 5 hours at 190° C. During that time, there is confirmed a very slow formation of carbon dioxide gas, which indicates the proceeding reaction between the tricarboxylic acid and the isocyanate group. The solution thus obtained becomes opaque during the reaction and whereby a uniform transparent solution cannot be given.

EXAMPLES

The following examples illustrate the present invention, but are not intended to be limitative of such.

Example 1

Two reflux condensers having calcium chloride tubes in their upper parts, a thermometer and a stirrer are attached to a four-necked flask of 2 liter capacity.

96.06 g. (0.5 mol) trimellitic anhydride and 125.13 g. (0.5 mol) of diphenylmethane-4.4'-diisocyanate and as a catalyst 10 g. of N-methyl-2-pyrrolidone were weighed out in a nitrogen-substituted dry box. They were heated for 10 minutes at 120° C. in an oil bath in a nitrogen-substituted dry box without stirring until the diphenylmethane-4.4'-diisocyanate was completely dissolved. Stirring was subsequently commenced. When further heated for one hour at 125° C. with stirring, a great deal of carbon dioxide was generated. Subsequently, the temperature was gradually raised to 195° C. within one hour's time, the mixture becoming viscous and producing a foamed product. This was roughly pulveriezd in nitrogen flow and subjected to solid state reaction for 4 hours. Then the contents of the flask were divided into two in two flasks. 400 g. of m-cresol was added to one of them, and heating and stirring were done to stabilize remaining isocyanate group and to effect dissolution at the same time, when a homogeneous transparent polymer solution was obtained. 250 g. of N.N-dimethylacetamide containing 10 g. of m-cresol was added to the other, and heating and stirring were done to stabilize remaining isocyanate groups and at the same time to effect dissolution. In this case, too, a homogeneous transparent polymer solution was obtained. When the infrared spectrum of the reaction product immediately after foaming was inspected, the absorption of 2260 cm.$^{-1}$ due to isocyanate was found still remaining intensely. In the infrared spectrum of the reaction product after solid state reaction was continued for 4 hours, however, the absorption of 2260 cm.$^{-1}$ due to isocyanate group had almost disappeared. When the infrared spectrum of the polymer solution stabilized by m-cresol was inspected, the absorption of 2260 cm.$^{-1}$ due to isocyanate group was found to have completely disappeared. The reduced specific viscosity of this resin treated with methanol was 0.361.

The film obtained from the solution of polymer dissolved in m-cresol was a strong, highly flexible and transparent one.

Its tensile strength was 12.8 kg./cm.$^2$, elongation 14.7%, and electrical properties: volume resistivity $8.8 \times 10^{13}$ Ω-cm. at DC 100 v., 23° C. dielectric constant 4.40 in normal condition at 1 kc., 23° C. loss factor $84.3 \times 10^{-4}$ in normal condition at 1 kc., 23° C., and breakdown voltage 14.8 kv./0.1 mm. (in oil). The properties of enamelled copper wire manufactured by baking this polymer solution in the usual way are given in Table 1. The film obtained from the solution of polymer dissolved in N.N-dimethylacetamide was also a strong and highly flexible one.

Example 2

In the same way as in Example 1, 96.06 g. (0.5 mol) of trimellitic anhydride and 125.13 g. (0.5 mol) of diphenylmethane-4.4'-diisocyanate are weighed out. They are caused to react for one hour at 120° C.–125° C. in an oil bath, and subsequently the temperature is raised to 190° C. within one hour and 30 minutes. Subsequently, the temperature is further raised to 200° C. within one hour's time, foaming and solidification taking place. After pulverizing this product, temperature is raised to 203° C., and reaction continued for 5 hours at this temperature.

400 g. of m-cresol is added to one half of the above product at 140° C., and heated for dissolution, when a homogeneous transparent polymer solution is obtained. 200 g. of N.N-dimethylacetamide (containing 5 g. of m-cresol) is added to the other half and heated for dissolution, when a homogeneous transparent polymer solution is obtained. The film obtained from this polymer solution is a strong, highly flexible and transparent one. In the infrared spectrum of the solid state reaction product before adding 15 g. of m-cresol, the absorption of 2260 cm.$^{-1}$ due to isocyanate group has almost disappeared. The reduced specific viscosity of the methanol-treated resin is 0.302.

Example 3

In the same way as in Example 1, 96.00 g. (0.5 mol) of trimellitic anhydride and 43.54 g. (0.25 mol) of a mixture of 2.4-trilenediisocyanate and 2,6 - trilenediisocyanate (mixing ratio=8:2) and 62.56 g. (0.25 mol) of diphenylmethane-4.4'-diisocyanate and as a catalyst 10 g. of N.N-dimethylacetamide are weighed out, caused to react at 110° C., for 2 hours 30 minutes, and the temperature is raised to 160° C., over a period of 1 hour 30 minutes, when foaming and solidifying take place. Then the temperature is raised to 180° C., and solid state reaction continued for 4 hours at this temperature. The film obtained from the polymer solution obtained by heating and dissolving it in 500 g. of N.N-dimethylacetamide containing 15 g. of m-cresol is a strong, highly flexible and transparent one. The reduced specific viscosity is 0.341.

Example 4

Two reflux condensers provided with calcium chloride tubes in their upper parts, a thermometer and a stirrer are attached to a four-necked flask of 2 liter capacity. Into this are weighed out 96.06 g. (0.5 mol) of trimellitic anhydride and 125.13 g. (0.5 mol) of diphenylmethane-4.4'-diisocyanate and as a catalyst 10 g. of N-methyl-2-pyrrolidone in a nitrogen-substituted dry box. They are heated for 10 minutes at 120° C. in oil bath in nitrogen flow without stirring, and stirring is commenced after diphenylmethane-4.4'-diisocyanate has thus completely dissolved. If heated for 1 hour at 125° C., a great deal of carbon dioxide is generated in the meantime, and when the temperature has been raised further to 195° C., over a period of 1 hour, the product becomes viscous in spite of strong stirring and a porous foamed product is formed. This is roughly pulverized in nitrogen flow, subjected to solid state reaction for 1 hour, and 100 cc. of solvent naphtha (boiling points 192–200° C.) is added and the temperature is raised, when reflux begins to take place after a while. The reaction product is found separated from solvent naphtha. After continuing the solid state reaction for about 3 hours, the contents of the reaction vessel are divided into two flasks. 300 g. of m-cresol is added to one of them, and heating and stirring continued to stabilize the still remaining isocyanate groups and to dissolve the product at the same time, when a homogeneous transparent polymer solution is obtained. 150 g. of N.N-dimethylacetamide containing 10 g. of m-cresol is added to the other, and heating and stirring are done to stabilize the still remaining isocyanate groups and to dissolve the product at the same time, when also a homogeneous transparent polymer solution is obtained. If the infrared spectrum of the reaction product immediately after foaming is inspected, it is found that the absorption of 2260 cm.$^{-1}$ due to isocyanate groups remains intensely. However, in the infrared spectrum of the reaction product after the addition of solvent naphtha, the absorption of 2260 cm.$^{-1}$ due to isocyanate group has disappeared. The reduced specific viscosity of this resin treated with methanol is 0.492.

The film obtained from the solution of the polymer in m-cresol is a strong, highly flexible and transparent one. Its tensile strength is 13.4 kg./cm.$^2$, elongation 14.7% and electrical properties as follows: insulation resistance $8.9 \times 10^{15}$ Ω-cm. at DC 100 v. 23° C., dielectric constant 4.36 in normal condition at 1 kc., 23° C., loss factor $90.4 \times 10^{-4}$ in normal condition at 1 kc., 23° C., and insulation breakdown voltage 14.5 kv./0.1 mm. (in oil). The properties of enamelled copper wire manufactured by baking this polymer solution in the usual way are shown in Table 1. The film obtained from the solution of the polymer in N.N-dimethylacetamide was also found to be strong, highly flexible one.

Example 5

In the same way as in Example 1, 96.06 g. (0.5 mol) of trimellitic anhydride and 125.13 g. (0.5 mol) of diphenylmethane-4.4'-diisocyanate and as a catalyst 10 g. of N.N-dimethylacetamide were weighed out and caused to react at 120° C. for 1 hour, when a great deal of carbon dioxide is generated. At this temperature a great deal of carbon dioxide is generated, while in Example 3 very little carbon dioxide is generated at this temperature. When the carbon dioxide generated was collected in water, it was more than three times that produced in Example 3. The temperature was further raised to 160° C., over a period of 30 minutes, when the product foams violently and solidifies. After pulverizing it in nitrogen flow, the temperature is raised to 190° C., and 200 cc. of solvent naphtha (boiling point 165° C.–175° C.) is added, when reflux begins after a while. Reaction is continued at this temperature for 3 hours, 10 g. of m-cresol is then added and the reaction is completed in 30 minutes. If the polymer obtained is heated and dissolved in m-cresol, it produces a homogeneous and transparent polymer solution. It is also soluble in N-methyl-2-pyrrolidone, N.N-dimethylacetamide and N.N-dimethylformamide. The film obtained from the solution of the polymer in N-methyl-2-pyrrolidone was found to be a strong, highly flexible and transparent one. Its tensile strength was 12.7 kg./cm.$^2$ and elongation 13.9%. When this film has been immersed in a 5% aqueous solution of caustic soda for 24 hours, no change in it was observed. The reduced viscosity of the resin treated with methanol was 0.450. The coating film baked on a copper plate did not crack when wound around a rod of a 3 mm. diameter.

Example 6

In the same way as in Example 1, 96.06 g. (0.5 mol) of trimellitic anhydride and 125.13 g. (0.5 mol) of diphenylmethane-4.4'-diisocyanate are weighed out. Reaction made for 1 hour at 120° C.–125° C. in oil bath, and the temperature is further raised to 180° C., when foaming and solidifying take place. After this product is pulverized, 100 g. of solvent naphtha (boiling point 190° C.–195° C.) is added and the temperature is raised to 203° C., when the reflux of solvent naphtha begins after a while. Reaction continued at this temperature for 3 hours, then 15 g. of m-cresol is added and the reaction was carried out for 30 minutes to complete it. If 350 g. of m-cresol is added to one half of this (containing solvent naphtha) at 140° C. and heated for dissolution, a homogeneous and transparent polymer solution is obtained. If 200 g. of N.N-dimethylacetamide (containing 5 g. of m-cresol) is added to the other half and heated for dissolution, a homogeneous and transparent polymer solution is obtained. The film obtained from this polymer solution is a strong, highly flexible and transparent one. If the infrared spectrum of the reaction product before the addition of 15 g. of m-cresol is inspected, it is found that the absorption of 2260 cm.$^{-1}$ due to isocyanate group has almost disappeared.

The reduced specific viscosity of the resin treated with methanol is 0.320.

Example 7

In the same way as in Example 1, 96.06 g. (0.5 mol) of trimellitic anhydride and 43.54 g. (0.25 mol) of a mixture of 2.4-trilenediisocyanate and 2.6-trilenediisocyanate (mixing ratio 8:2) and 62.56 g. (0.25 mol) of diphenylmethane-4.4'-diisocyanate and as a catalyst 10 g. of N.N-dimethylacetamide are weighed out. They are caused to react at 110° C. for 2 hours 30 minutes and the temperature is raised to 160° C., over a period of 1 hour, when foaming and solidifying take place. If 150 cc. of solvent naphtha (boiling point 165° C.–175° C.) is added then reflux begins after a while, and solid state reaction is continued at this temperature for 3 hours. The film obtained from the polymer solution obtained by heating and dissolving this product in 450 g. of N.N-dimethylacetamide is a strong, highly flexible and transparent one. The reduced specific viscosity is 0.371.

Example 8

In the same way as in Example 1, 96.06 g. (0.5 mol) of trimellitic anhydride and 125.13 g. (0.5 mol) of diphenylmethane-4.4'-diisocyanate and as a catalyst 10 g. of N-methyl-2-pyrrolidone are weighed out, caused to react for 1 hour at 120° C., and the temperature is raised to 200° C., over a period of 1 hour, when foaming and solidifying take place. After roughly pulverizing in nitrogen flow, 500 cc. of solvent naphtha (whole boiling point is 165° C.–175° C. and which has previously been heated in another flask to the reflux temperature) is added and refluxed, then 10 g. of m-cresol is added and the reaction completed in 30 minutes. 400 g. of m-cresol is added to one half of the polymer obtained by removing the solvent naphtha, and heated for dissolution, when a homogeneous and transparent polymer solution is obtained. 230 g. of N-methyl-2-pyrrolidone (containing 5 g. m-cresol) is added to the other half, and heated for dissolution, when also a homogeneous and transparent polymer solution is obtained. The reduced specific viscosity is 0.377. If the infrared spectrum of the reaction product immediately after foaming is inspected, it is found that the absorption of 2260 cm.$^{-1}$ due to isocyanate group is almost disappeared in the infrared spectrum of the reaction product after the addition of solvent naphtha. The films obtained from the solutions of the polymer is m-cresol and N-methyl-2-pyrrolidone were found to be strong, highly flexible and transparent ones.

Example 9

In the same way as in Example 1, 12.46 g. (0.075) of isophthalic acid and 62.56 g. (0.25 mol) of diphenylmethane-4.4'-diisocyanate and as a catalyst 7 g. of N-methyl-2-pyrrolidone are weighed out and caused to react at 130° C. for 45 minutes, when isophthalic acid at last begins to dissolve into a homogeneous condition, when the solution is light grey and transparent. After a lapse of further 20 minutes, it becomes yellow. At this point, 33.62 g. (0.175 mol) of trimellitic anhydride is added and reaction continued for 45 minutes, and then the temperature is raised to 180° C., in 1 hour, when the product foams and solidifies. If 200 cc. of solvent naphtha (boiling point 165° C.–175° C.) is added, reflux begins after a while. After reaction at this temperature for 3 hours, 150 cc. of solvent naphtha is removed and 250 g. of N.N-dimethylacetamide (containing 4 g. of m-cresol) is added to dissolve it to obtain a polymer solution while stabilizing the still remaining isocyanate groups with m-cresol. The reduced specific viscosity of the methanol-treated resin was found to be 0.354.

The properties of enamelled copper wire manufactured by baking this polymer solution in the usual way as shown in Table 1.

Example 10

Two reflux condensers provided the calcium chloride tubes in their upper parts, a thermometer and a stirrer are attached to a four-necked flask of 2 liter capacity. 96.06 g. (0.05 mol) of trimellitic anhydride and 125.13 g. (0.5 mol) of diphenylmethane-4.4'-diisocyanate and as a catalyst, 5 g. of N-methyl-2-pyrrolidone and 20 cc. of solvent naphtha (boiling point 192–200° C.) are weighed out in a nitrogen-substituted dry box. They are heated for 10 minutes at 120° C. in oil bath without stirring in nitrogen flow, and stirring is begun after diphenylmethane-4.4'-diisocyanate has completely dissolved. If heated for 1 hour at 125° C., a great deal of carbon dioxide is generated in the meantime, and when the temperature is raised to 195° C., in 1 hour, the product becomes viscous in spite of strong stirring and a porous foamed product is formed. The volume of the product in the reaction vessel was found to be about ¾ of the capacity of the vessel. After 1 hour, the product is roughly pulverized in nitrogen flow, kept at 220° C., with an addition of 20 cc. solvent naphtha (boiling point 192–200° C.) and subjected to solid state reaction for 1 hour 30 minutes. The reaction product is found separated from solvent naphtha. The contents of the reaction vessel are divided into two flasks. 300 g. of m-cresol is added to one of them, and heated further and stirred for stabilizing the still remaining isocyanate groups and for dissolving at the same time, when a homogeneous transparent polymer solution is obtained. 250 g. of N.N-dimethylacetamide containing 10 g. of m-cresol is added to the other half and heated and stirred for dissolving, when also a homogeneous transparent solution is obtained. If the infrared spectrum of the reaction product immediately after foaming is inspected, it is found that the absorption of 2260 cm.$^{-1}$ due to isocyanate group remains intensely. However, in the infrared spectrum of the reaction product after the addition of solvent naphtha, the absorption of 2260 cm.$^{-1}$ due to isocyanate group has disappeared. The reduced specific viscosity of this resin treated with methanol is 0.570.

The film obtained from the solution of this resin dissolved in m-cresol is a strong, highly flexible and transparent one. Its tensile strength is 13.4 kg./mm.$^2$ and elongation 14.7%. Its electrical properties are as follows: insulation resistance $8.9 \times 10^{15}$ Ω-cm. at DC 100 v., 23° C.; dielectric constant 4.36 in normal condition at 1 kc., 23° C.; loss factor $90.4 \times 10^{-4}$ in normal condition at 1 kc., 23° C.; and insulation breakdown voltage 14.5 kv./0.1 mm. (in oil). The properties of enamelled copper wire manufactured by baking this polymer solution in the usual way are shown in Table 1. The film obtained from a solution of the polymer dissolved in N.N-dimethylacetamide was also found to be a strong and highly flexible one.

Example 11

In the same way as in Example 1, 96.06 g. (0.5 mol) of trimellitic anhydride and 125.13 g. (0.5 mol) of diphenylmethane-4.4'-diisocyanate and 50 cc. of solvent naphtha (boiling point 192–200° C.) were measured out into the reaction vessel, caused to react for 1 hour at 120° C., and then the temperature raised to 200° C., in 1 hour, when foaming and solidifying took place. The volume of the reaction product in the reaction vessel was found to be about ¼ of the capacity of the vessel.

A solid state reaction is made at this temperature for 3 hours. 350 g. of m-cresol were added to one half of the polymer and heated for dissolving, thus obtaining a homogeneous and transparent polymer solution. 220 g. of N-methyl-2-pyrrolidone (containing 5 g. of m-cresol) was added to the other half, and heated for dissolving, when also a homogeneous and transparent polymer solution was obtained. The reduced specific viscosity is 0.405. If the infrared spectrum of the reaction product immediately after foaming is inspected, it is found that the absorption of 2260 cm.$^{-1}$ due to isocyanate group remains intensely. In the infrared spectrum of the reaction product of the solid state reaction, however, the absorption of 2260 cm.$^{-1}$ due to isocyanate group has already disappeared. The films obtained from the solutions of the polymer dissolved in m-cresol and in N-methyl-2-pyrrolidone were found to be strong, highly flexible and transparent ones.

Example 12

In the same way as in Example 1, 96.06 g. (0.5 mol) of trimellitic anhydride and 87.03 g. (0.5 mol) of a mixture of 2.4-trilenediisocyanate and 2.6-trilenediisocyanate (mixing ratio 8:2) and 0.2 g. of a mixture in equal mols of dibutyltin dilaurate and triethylamine and 20 cc. of solvent naphtha (boiling point 165–175° C.) are measured out, caused to react for 2 hours at 110° C., and the temperature is raised to 180° C., in 1 hour, when foaming and solidifying take place. After 1 hour, 20 cc. of solvent naphtha (boiling point 165–175° C.) is added and solid state reaction continued for 2 hours at 200° C. The volume of the reaction product in the reaction vessel was found to be about ½ of the capacity of the vessel. The film obtained from the polymer solution prepared by heating and dissolving this in 400 g. of N.N-dimethylacetamide containing 15 g. of m-cresol is strong, highly flexible and transparent. The reduced specific viscosity is 0.393.

TABLE 1

| | Example 1 | Example 4 | Example 9 | Example 10 |
|---|---|---|---|---|
| Construction: | | | | |
| Conductor diameter (mm) | 1.003 | 1.003 | 1.004 | 1.003. |
| Finished diameter (mm.) | 1.063 | 1.063 | 1.084 | 1.079. |
| Film thickness (mm.) | 0.030 | 0.030 | 0.040 | 0.040. |
| Flexibility: | | | | |
| Jerking | Good | Good | Good | Good. |
| Winding pinholes | do | do | 1d good | 1d good. |
| Heat-shock: | | | | |
| Normal winding: | | | | |
| 250° C.×2 hr | 2d good | 2d good | 2d good | 2d good. |
| 300° C.×2 hr | do | do | do | Do. |
| Cut through temperature: 4-point cross load 5 kg., 1° C./2 minutes up. | 365° C. or more | 365° C. or more | 350° C. or more | 365° C. or more. |
| Breakdown voltage (kv.): | | | | |
| Normal condition | 8.5 | 8.5 | 8.4 | 8.5. |
| After 25° C.×24 hr | 7.3 | 7.3 | 7.3 | 7.3. |
| Resistance to solvents: | | | | |
| Immersion 50° C.×24 hr.: | | | | |
| Benzene | Good | Good | Good | Good. |
| m-Cresol | do | do | do | Do. |
| N.N-dimethyl-acetamide | do | do | Partial swelling | Cracking. |
| Resistance to Styrol: 120° C.×2 hr | do | do | Good | Good. |
| Resistance to chemicals: | | | | |
| Immersion 50° C.×2 hr.: | | | | |
| H₂SO₄(d-1.2) | do | do | do | Do. |
| NaOH (3%) | do | do | do | Do. |
| Resistance to abrasion: 700 g. load, round-trip number. | 143 | 155 | 167 | 164. |

Although the present invention has been adequately described in the foregoing specification and examples included therein, it is readily apparent that various changes and modifications can be made without departing from the spirit and scope thereof.

What is claimed is:

1. A method for preparing phenolic acidic solvent-soluble and infusible linear aromatic polyamide-imides of high molecular weight, the molecular structure of which includes amide bonding and a 5-membered imide ring which comprises subjecting a tricarboxylic anhydride and a diisocyanate to heating and melt state reactions at a temperature of from about 40° C. to not exceeding 205° C., and then subjecting said reactants to a solid state polymerization reaction at a temperature of from about 40° C. to not exceeding 205° C., the molar ratio of said diisocyanate to said tricarboxylic anhydride being 1:1, said melt state reaction being carried out for an amount of time sufficient to bring a gradual increase to the molecular weight of the polymer in its linear state and to cause the melt state reaction temperature to exceed the initial tricarboxylic acid anhydride and diisocyanate reaction temperature and, said solid state reaction being carried out for an amount of time sufficient to permit the polymer, in its solid phase, to increase in molecular weight.

2. The method of claim 1, wherein a chemically inert liquid, not reactive with isocyanate, carboxyl or acid anhydride groups and which will not dissolve the reaction product, is used as a heating medium in said solid state polymerization as a means for obtaining a uniform distribution of reaction temperature not exceeding 205° C.

3. The method of claim 2, wherein said chemically inert liquid is added from the initial period of the melt state reaction.

4. The method of claim 1, wherein a material selected from the group consisting of an organic polar reagent and an organic metallic compound, to promote the reaction of isocyanate groups and active hydrogen, is employed as a catalyst to accelerate the reaction.

5. The method of claim 2, wherein an aromatic hydrocarbon is employed as the chemically inert liquid.

6. The method of claim 3, wherein an aromatic hydrocarbon is used as the chemically inert liquid.

References Cited

UNITED STATES PATENTS

| 3,314,923 | 4/1967 | Muller et al. | 260—77.5 M |
| 3,347,828 | 10/1967 | Stephens et al. | 260—47 CP |
| 3,445,477 | 5/1969 | Muller et al. | 260—30.2 |
| 3,489,696 | 1/1970 | Miller | 260—78 TF |
| 3,518,230 | 6/1970 | Sheffer et al. | 260—33.4 P |
| 3,578,639 | 5/1971 | Sheffer | 260—33.4 P |

ALLAN LIEBERMAN, Primary Examiner

U.S. Cl. X.R.

260—30.2, 33.4 P